US006444259B1

(12) United States Patent
Subramanian et al.

(10) Patent No.: US 6,444,259 B1
(45) Date of Patent: Sep. 3, 2002

(54) THERMAL BARRIER COATING APPLIED WITH COLD SPRAY TECHNIQUE

(75) Inventors: Ramesh Subramanian, Oviedo; Gregg P. Wagner, Apopka; Brij B. Seth, Maitland, all of FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/774,550

(22) Filed: Jan. 30, 2001

(51) Int. Cl.$^7$ ................................ B05D 1/02
(52) U.S. Cl. .................. 427/191; 427/192; 427/203; 427/205; 427/421
(58) Field of Search .................. 427/142, 191–193, 427/199, 203, 205, 405, 421; 239/79, 85; 134/7; 148/537

(56) References Cited

U.S. PATENT DOCUMENTS

| | | | |
|---|---|---|---|
| 2,149,253 A | | 3/1939 | Cooper |
| 3,100,724 A | * | 8/1963 | Rocheville |
| 3,455,510 A | | 7/1969 | Rotolico |
| 3,754,976 A | | 8/1973 | Babecki et al. |
| 4,073,599 A | | 2/1978 | Allen et al. |
| 4,382,811 A | | 5/1983 | Luscher et al. |
| 4,416,421 A | | 11/1983 | Browning |
| 4,430,360 A | | 2/1984 | Bill et al. |
| 4,552,784 A | | 11/1985 | Chu et al. |
| 4,576,874 A | | 3/1986 | Spengler et al. |
| 4,610,698 A | | 9/1986 | Eaton et al. |
| 4,619,845 A | | 10/1986 | Ayers et al. |
| 4,639,399 A | | 1/1987 | Aprigliano |
| 4,714,622 A | | 12/1987 | Omori et al. |
| 4,764,089 A | | 8/1988 | Strangman |
| 4,854,196 A | | 8/1989 | Mehan |

(List continued on next page.)

FOREIGN PATENT DOCUMENTS

| | | |
|---|---|---|
| EP | 0 718 419 A2 | 6/1996 |
| EP | 0 718 420 A1 | 6/1996 |

OTHER PUBLICATIONS

M.F. Smith, et al. Cold Spray Direct Fabrication—High Rate, Solid State, Material Consolidation, Proc. of Fall 1998 Meeting of the Materials Research Soc., Boston, MA. Nov. 30–Dec. 4, 1998.
D.L. Gilmore, et al. Particle Velocity and Deposition Efficiency in the Cold Spray Process JTTEE5 8:576–582 (Submitted Dec. 1, 1998; in revised form May 21, 1999).
H. Kreye, T. Stoltenhoff, Cold Spraying—A Study of Process and Coating Characteristics Universitat der Bundeswehr, Hamburg, Germany.
R.C. Dykhuizen and M.F. Smith, Gas Dynamic Principles of Cold Spray (Submitted Sep. 10, 1997, in revised form Mar. 9, 1998).
R.C. Dykhuizen, et al. Impact of High Velocity Cold Spray Particles (Submitted Nov. 20, 1998; in revised form May 12, 1999).
Dr. Mark F. Smith, Overview of Cold Spray, Cold Spray Workshop Albuquerque, NM Jul. 14–15, 1999.
Mark F. Smith, et al. Thermal Spray at Sandia, Process & Materials Development to Support the D.O.E. and U.S. Industrial Competitiveness.
Sandia's Approach to Cold Spray Research Thermal Spray Research Laboratory.

*Primary Examiner*—Fred J. Parker

(57) ABSTRACT

A process (20) for applying a thermal barrier coating (51) to a turbine component (50) including the step (34) of depositing a bond coating layer (56) by, directing solid particles using a cold spray process. The layer of bond coating material may have different depths (80,82) in different areas of the component (50), and it may have different compositions (60,62) across its depth. The precise control afforded by the cold spray material deposition step allows the surface of the bond coating material layer to be formed with a predetermined surface roughness or with a plurality of micro-ridges (86) in order to optimize its bond to the overlying ceramic insulating layer (52).

18 Claims, 3 Drawing Sheets

U.S. PATENT DOCUMENTS

| | | | |
|---|---|---|---|
| 4,865,252 A | 9/1989 | Rotolico et al. |
| 4,867,639 A | 9/1989 | Strangman |
| 4,880,614 A | 11/1989 | Strangman et al. |
| 4,913,961 A | 4/1990 | Jones et al. |
| 4,914,794 A | 4/1990 | Strangman |
| 4,916,022 A | 4/1990 | Solfest et al. |
| 4,964,568 A | 10/1990 | Rotolico et al. |
| 4,999,225 A | 3/1991 | Rotolico et al. |
| 5,006,321 A | 4/1991 | Dorfman et al. |
| 5,024,884 A | 6/1991 | Otfinoski |
| 5,048,183 A | 9/1991 | Cang et al. |
| 5,059,095 A | 10/1991 | Kushner et al. |
| 5,180,285 A | 1/1993 | Lau |
| 5,210,944 A | 5/1993 | Monson et al. |
| 5,302,414 A | 4/1994 | Alkhimov et al. |
| 5,506,055 A | 4/1996 | Dorfman et al. |
| 5,516,586 A | 5/1996 | Singer et al. |
| 5,518,178 A * | 5/1996 | Sahoo et al. |
| 5,536,022 A | 7/1996 | Sileo et al. |
| 5,596,912 A | 1/1997 | Laurence et al. |
| 5,704,759 A | 1/1998 | Draskovich et al. |
| 5,730,806 A | 3/1998 | Caimi et al. |
| 5,773,141 A | 6/1998 | Hasz et al. |
| 5,780,116 A | 7/1998 | Sileo et al. |
| 5,780,171 A | 7/1998 | Nissley et al. |
| 5,782,414 A | 7/1998 | Nathenson |
| 5,795,626 A | 8/1998 | Gabel et al. |
| 5,817,267 A | 10/1998 | Covino et al. |
| 5,845,846 A | 12/1998 | Watanabe et al. |
| 5,912,087 A | 6/1999 | Jackson et al. |
| 5,928,719 A * | 7/1999 | Mishima et al. |
| 5,939,147 A | 8/1999 | Jones |
| 5,997,248 A | 12/1999 | Ghasripoor et al. |
| 6,015,586 A | 1/2000 | Omori et al. |
| 6,038,900 A | 3/2000 | Miyasaka |
| 6,102,656 A | 8/2000 | Nissley et al. |
| 6,103,186 A | 8/2000 | Sievers et al. |
| 6,106,959 A | 8/2000 | Vance et al. |

\* cited by examiner

THERMAL BARRIER COATING APPLIED WITH COLD SPRAY TECHNIQUE

This invention relates generally to the field of materials technology, and more specifically to the field of thermal barrier coatings for high temperature applications, and specifically to a process for manufacturing a turbine component by applying layers of a thermal barrier coating using a cold spray technique, and to a component manufactured with such a process.

BACKGROUND OF THE INVENTION

It is well known that the power and efficiency of operation of a gas turbine engine or a combined cycle power plant incorporating such a gas turbine engine may be increased by increasing the firing temperature in the combustion portions of the turbine. The demand for improved performance has resulted in advanced turbine designs wherein the peak combustion temperature may reach 1,400 degrees C. or more. Special materials are needed for components exposed to such temperatures. Nickel and cobalt based super alloy materials are now used for components in the hot gas flow path, such as combustor transition pieces and turbine rotating and stationary blades. However, even super alloy materials are not capable of surviving long term operation in a modern gas turbine without some form of insulation from the operating environment.

It is known to coat a superalloy metal component with an insulating ceramic material to improve its ability to survive high operating temperatures in a combustion turbine environment. One thermal barrier coating system 10 in common use today is illustrated in FIG. 1. A ceramic top coat 12 applied to a super alloy substrate structure 18, with an intermediate metallic bond coat 16. An example of a commercially available super alloy material 18 is IN738 made by Inco Alloys International, Inc. A common ceramic insulating material 12 is yttria stabilized zirconia (YSZ). Hafnia or scandia stabilized zirconia may also be used as layer 12, or alternatively, yttrium aluminum garnet (YAG). The bond coat layer 16 provides oxidation resistance and improved adhesion for the thermal barrier coating layer 12. Common bond coat materials 16 include MCrAlY and MCrAlRe, where M may be nickel, cobalt, iron or a mixture thereof. The metallic bond coat material 16 has the additional function of supplying aluminum to form a thermally grown oxide (TGO) layer 14, which may be formed substantially of aluminum oxide. The oxide layer 14 develops during manufacturing heat treatment operations and during the operating service of the turbine, and it may grow from 0 to 15 micrometers thick through the life of the coating 10. This oxide layer provides oxidation resistance for the underlying super alloy 18 and provides an improved bond between the ceramic layer 12 and the metallic bond coat 16. The thermally grown oxide layer may alternatively be grown on a platinum enriched bond coat or platinum aluminide. To achieve such an embodiment, a layer of platinum is first applied to the surface of the bond coat layer 16 and then is diffused into the bond coat layer 16 by a diffusion heat treatment.

The metallic bond coat layer 16 is known to be applied by any one of several thermal spray processes, including low pressure plasma spray (LPPS), air plasma spray (APS) and high velocity oxy-fuel (HVOF). Such processes propel the MCrAlY material in a molten plasma state against the surface of the super alloy substrate 18 where it cools and solidifies to form a coating. Such thermal spray process are known to result in a significant amount of porosity and the formation of oxygen stringers in the bond coat layer 16 due to the inherent nature of the high temperature process. The release of heat from the molten particles of MCrAlY and the transfer of heat from the high temperature gas used in the thermal spray process also result in a significant increase in the surface temperature of the super alloy substrate material 18 during the metallic bond coat 16 application process. Such elevated temperatures result in localized stresses in the super alloy material 18 upon the cooling of the coating layer. Furthermore, a post-deposition diffusion heat treatment is necessary to provide the required metallurgical bond strength, and such treatment may have adverse affects on the material properties of the underlying substrate.

The known processes for manufacturing thermal barrier coating systems have numerous limitations, such as the creation of residual stresses, the formation of coating layers containing voids and porosity, the need for specialized thermal spraying equipment that is not adaptable for field repair operations, and a high cost of manufacturing. Thus, an improved process is needed for manufacturing components having a thermal barrier coating.

BRIEF DESCRIPTION OF THE INVENTION

The present inventors have recognized that a cold spray process is beneficial for the application of a metallic bond coat layer of a thermal barrier coating for a combustion turbine engine part. The cold spraying of bond coat powders allows for the deposition of a dense oxidation and corrosion resistant coating on both new and service-run gas turbine components. Because a cold spray process produces a coating having essentially no porosity and no oxygen stringers, the performance of the bond coating during the operation of the component will be improved when compared to prior art flame or thermally sprayed coatings.

Because the area to which a coating is applied may be limited and controlled during a cold spraying process, new components may be fabricated using a cold spray process for filling gaps or discontinuities in a bond coat layer during the original manufacturing process. Furthermore, components that have been damaged by mishandling or by out-of-specification machining may be repaired using a cold spray technique.

In one embodiment of the invention, the thickness of a bond coat layer is varied along a surface of a turbine component, with a thicker coating being applied in those areas of the component exposed to the highest temperatures during turbine operation. In a further embodiment of the invention, the composition of a bond coat layer is varied along a surface of a turbine component. This may be particularly advantageous to reduce the consumption of an expensive material, such as platinum, by limiting the application of such material to only those portions of the component where the resulting benefit is necessary. Such variations in coating applications may be accomplished without masking, thereby eliminating process steps and eliminating the geometric discontinuity normally associated with the edge of a masked area.

In a further embodiment of the present invention, the composition of a bond coat layer applied by a cold spray process is varied along a depth dimension. The material of the first layers to be applied is selected to minimize inter-diffusion with the underlying substrate material, and the material of the top layers is selected to optimize resistance to oxidation and corrosion.

A process for manufacturing a turbine component in accordance with the present invention is more economical than prior art processes because there is no need for a high temperature heat treatment following the deposition of the bond coat. As a result, the initial interdiffusion zone between the substrate and bond coat is minimized. Thus, the amount of aluminum available in the bond coat layer for the subsequent formation of a thermally grown oxide layer is increased when compared to components formed with prior art processes. This results in improved performance of the thermal barrier coating system.

In a further embodiment of this invention, the roughness of the surface of a bond coat layer is controlled to a desired value by controlling the parameters of a cold spray process. A desirable degree of roughness may be obtained without the need for post-deposition processing.

These and other objects and advantages of the invention are provided by way of example, not limitation, and are described more fully below.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

U.S. Pat. 5,302,414 dated Apr. 12, 1994, incorporated by reference herein, and re-examination certificate B1 5,302,414 dated Feb., 25, 1997, describe a cold gas-dynamic spraying method for applying a coating, also referred to as cold spraying. That patent describes a process and apparatus for accelerating solid particles having a size from about 1–50 microns to supersonic speeds in the range of 300–1,200 meters per second and directing the particles against a target surface. When the particles strike the target surface, the kinetic energy of the particles is transformed into plastic deformation of the particles, and a bond is formed between the particles and the target surface. This process forms a dense coating with little or no thermal effect on the underlying target surface.

Figure 2:
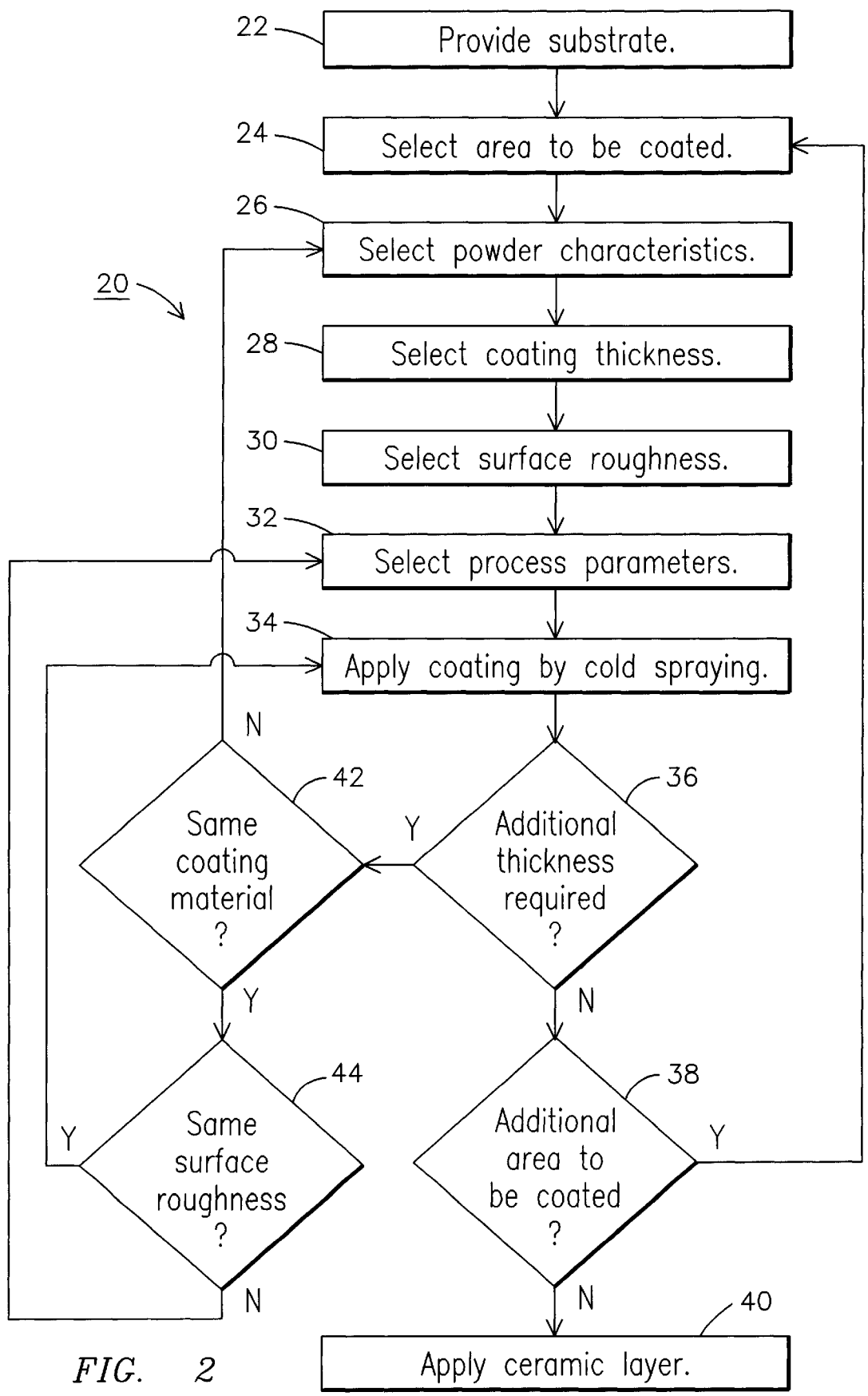
FIG. 2 illustrates the steps of a method for providing a thermal barrier coating system wherein a bond coat layer is deposited by a cold spray process.

The present inventors have recognized that a cold spray process may be beneficial for the application of a metallic bond coat layer of a thermal barrier coating system. A process 20 for providing a thermal barrier coating incorporating a bond coat layer applied by a cold spray process is illustrated in FIG. 2 and is described more fully below.

A gas turbine engine is designed to have various components exposed to the hot gas flow path during the operation of the turbine. Such components may include, for example, rotating blades, stationary vanes, combustor baskets, ring segments, transitions, etc. Such components are manufactured by first providing a substrate material at step 22 formed to an appropriate shape in accordance with the engine design. The substrate material may be any material known in the art for such applications, and may include wrought, conventionally cast, directionally solidified (DS) and single crystal (SC) materials. The substrate material may be a nickel or cobalt based superalloy material.

On the basis of the design temperatures within the turbine, certain areas of the component may require a thermal barrier coating. One such thermal barrier coating includes a layer of ceramic insulating material deposited over a metallic bond coat layer applied directly to the surface of the substrate. The area of the component to be coated with the bond coat layer is identified at step 24, and the required thickness of the coating is selected at step 28. A bond coat layer, such as a layer of MCrAlY having a thickness of between 75–200 micrometers, not only provides a surface suitable for the application of overlying ceramic layers, but it also functions as a thermal insulator for the substrate material, and as a barrier against the migration of oxygen and other corrosive materials into the substrate material. The bond coat layer may be used without an overlying ceramic insulating material in some applications.

The material to be cold sprayed to form the desired coating is selected at step 26. As is described in U.S. Pat. 5,302,414, the material may be prepared to contain particles ranging in size from about 1–50 microns by any known melt/atomization process. The desired surface roughness of the applied coating is selected at step 30. The surface roughness obtained may be affected by varying the cold spray application parameters selected at step 32. An initial layer of bond coat material is applied to a substrate at step 34 utilizing the material selected at step 26 and the process parameters selected at step 32 to obtain a coating with a desired thickness and surface roughness. A decision is then made at step 36 if an additional thickness of coating is desired on the same area of the component. If not, a decision is made at step 38 if there is an additional area of the component to be coated. If not, the component is then processed through any remaining manufacturing steps, such as applying a ceramic coating layer over the bond coat layer at step 40. The cold spray material deposition step 34 involves directing particles of the coating material toward the target surface at a velocity sufficiently high to cause the particles to deform and to adhere to the target surface. Such process will provide a dense coating of the material having a very low incidence of porosity and oxygen stringers. As a result, the bond coat layer applied at step 34 will provide improved resistance to oxidation of the substrate and reduced susceptibility to spalling of the overlying ceramic layer when compared to prior art thermally deposited bond coat layers. Particles of from 0.1 to 50 microns may be accelerated to speeds of from 500–1,200 meters per second. A feed rate of from 0.1 to 2 grams per second may be deposited while traversing across a target surface at an advance rate of between 0.01–0.4 meters per second.

Figure 3:
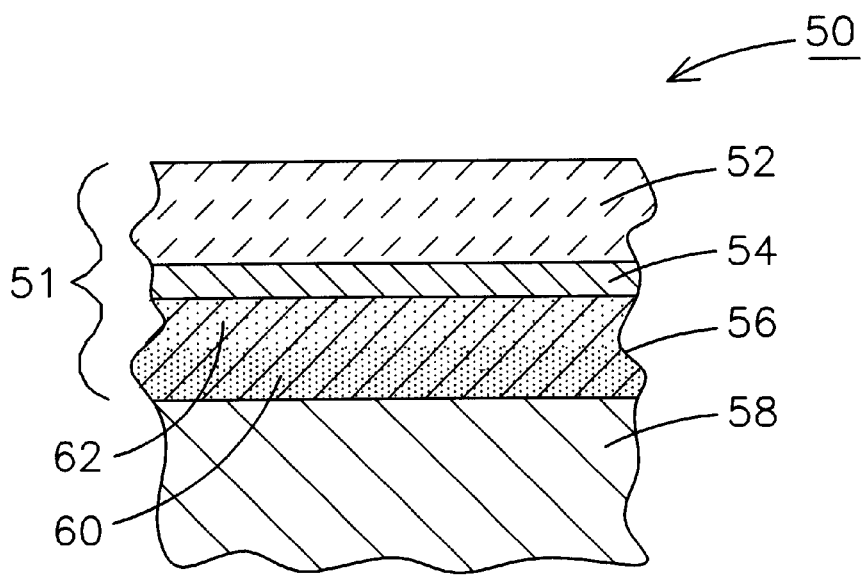
FIG. 3 illustrates a thermal barrier coating applied by a cold spray process and having varying material properties across the depth of the bond coat layer.
Figure 4:
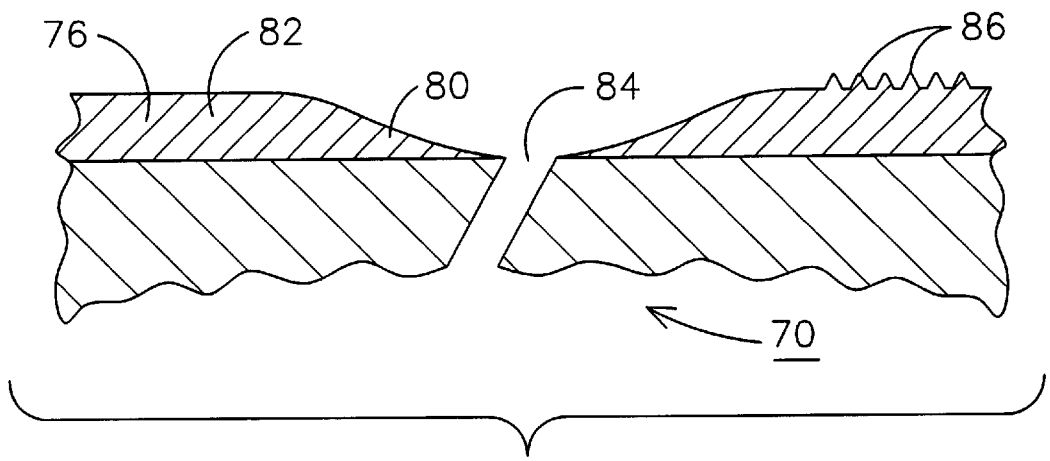
FIG. 4 is a partial cross-sectional view of a turbine blade having a thermal barrier coating including a bond coat layer with varying thickness.

The inventors have found that the use of a cold spraying process 34 facilitates the deposition of a bond coat layer 56 having varying material properties across the depth of the coating, as illustrated in FIG. 3. A turbine component 50 includes a substrate 58 insulated by a thermal barrier coating system 51 including ceramic layer 52 deposited on a bond coat layer 56. A thermally grown oxide layer 54 is formed by the oxidation of aluminum diffusing from within the bond coat layer 56. The bond coat layer 56 is deposited on the substrate 58 with a cold spraying process in step 34 of FIG. 2. It is known in the art to provide a separate barrier layer between the substrate 58 and the bond coat layer 56 in order to minimize the interdiffusion of materials between the two layers. Known barrier layer materials include rhenium, tantalum, platinum, and alloys thereof. The present inventors have recognized that the function of a separate barrier layer may be incorporated into the bond coat layer 56 by forming the bond coat layer 56 to have varying materials properties across its depth. The first portion 60 of the bond coat layer 56 is formed by cold spraying particles of material selected for its resistance to the diffusion of aluminum and other materials into or out of the substrate material 58. For example, the particles selected at step 26 of FIG. 2 may be a mixture of MCrAlY with a high percentage of rhenium, tantalum, platinum or alloys thereof. The second portion 62 of the bond coat layer 56 is formed by cold spraying particles of material selected to maximize the coating's oxidation and corrosion resistance, such as an MCrAlY having about 16–25 weight percent chromium, 6–15 weight percent aluminum, 0.1–0.5 weight percent yttrium, and the balance nickel and/or cobalt. After one or more layers 60 are applied to the substrate 58, a decision is made as indicated at step 42 of FIG. 2 to apply a different composition of coating material for subsequent layers 62. FIG. 4 is illustrated as having two portions 60,62 within the bond coat layer 56, however, more than two such portions may be used. In one embodiment, a continuously variable coating layer may be applied, with the composition of the particles cold sprayed onto the substrate being gradually changed from a first initial chemistry to a second final chemistry. Alternatively, a single step change in the material composition may be provided.

The thickness of a bond coat layer may be selected at step 28 to be different for different portions of the substrate, depending upon the localized environment to which those various portions will be exposed during the operation of the component. FIG. 4 illustrates a portion of a gas turbine blade 70 wherein a bond coat layer 76 has a first thickness in a first area 80 and a second, larger thickness in a second area 82. In this embodiment, the thickness is purposefully reduced proximate a cooling air hole 84 formed in the substrate material 78. A cold spraying nozzle may be controlled to apply a coating to only a small, well-defined area. The thickness of the coating is relatively constant in the target area, for certain nozzle designs an area having a radius of from only 3 mm to 12 mm, and it tapers smoothly to zero a short distance outside that area. Areas of different thickness may be obtained by varying the application parameters from one area to another along the surface of the component, or by applying more layers to one area than another. The resulting change in thickness from an area 80 to another 82 may thereby be formed to be a gradual change without the usual step change in thickness associated with the use of a masking process.

In order to improve the adhesion of a subsequent top coat, it may be desirable to provide the top surface of a bond coat layer with a predetermined degree of roughness. An MCrAlY layer applied by prior art low pressure plasma spray methods will exhibit a roughness of about 5–6 microns Ra in the as-deposited condition. This surface is acceptable for receiving an insulating layer applied by an APS process, however, a smoother surface is needed to receive an insulating layer applied by an electron beam plasma vapor deposition (EBPVD) process. Because an EBPVD process provided improved performance for the thermal barrier coating, it is preferred for those parts in a combustion turbine exposed to the hotest temperatures. Accordingly, prior art parts having a bond coat layer applied by LPPS need to be polished to about a 1–2 micron Ra finish, such as by being tumbled in a polishing media for up to eight hours. Not only does such polishing add time and expense to the fabrication process, it is also known to create near-surface defects which increase the risk of oxidation of the bond coating and spalling of the overlying ceramic layer. To move from a rougher surface finish to a smoother finish with the same material of a cold sprayed bond coat layer, the application parameters selected at step 32 of FIG. 2 may be adjusted to include one or more of the following: a higher gas temperature; a higher gas velocity; and a smaller particle size. Such changes may be incorporated on only the topmost layers or throughout the entire depth of the coating. It may also be desirable to deposit a plurality of micro-ridges 86 on the surface of a bond coat layer by controlling the cold spray process parameters to provide an engineered surface topography. Such micro-ridges may be on the order of a few to 10 or more micrometers in height and may be placed at equal or variable intervals across the surface of the bond coat material. Such micro-ridges may be deposited by using a specially designed nozzle capable of creating such a fine line on the target surface, or they may be created by the incremental movement of the nozzle between succeeding passes across the surface.

Figure 1:
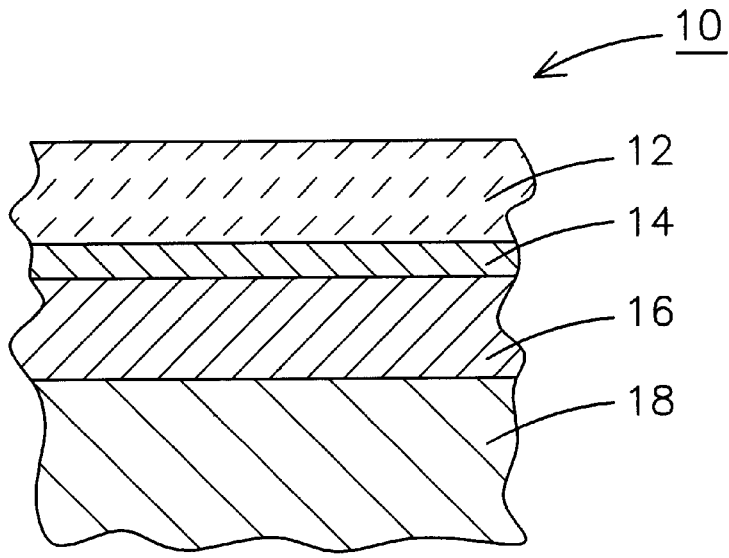
FIG. 1 is a cross-sectional view of a prior art thermal barrier coating system.

The impact of solid particles upon a target surface during a cold spraying process results in the plastic deformation of the particles and the localized heating of the deformed particles. The kinetic energy released by the deceleration of the particles upon their collision with the target surface becomes available for the fracturing of the crystal bonds within the particles. For this reason, different coating materials react differently to the cold spraying process, as illustrated in Table 2 of U.S. patent application No. 5,302,414. Preferred bond coating materials for thermal barrier coating systems include MCrAlY, which is relatively non-ductile material when compared to other commonly sprayed metals, such as copper, aluminum, nickel and vanadium. In order to promote the plastic deformation of MCrAlY particles upon high speed impact with a substrate surface, it is preferred to use the nanophase form of the MCrAlY alloy. Such material may be formed by processes known in the art by controlling the cooling rate during formation of the particles, or by the agglomeration of finer particles. The efficiency of a manufacturing process for producing turbine components having a thermal barrier coating may be improved by applying the base coat for the thermal barrier coating using a cold spraying process. The prior art device of FIG. 1 required a difusion heat treatment process following the thermal spraying of the bond coat layer 16 onto the substrate material 18. Accordingly, following the thermal spray application of an MCrAlY coating layer 16 to a super alloy substrate material 18, the component is subjected to a heat treatment process, such as heating to a temperature of approximately 1050–1150 degrees Centigrade for 1–4 hours. No such heat treatment step is necessary following cold spray material deposition step 34, thereby eliminating the time and cost required for such an operation during the manufacturing of a turbine part such as turbine blade 70 of FIG. 4.

The elimination of the diffusion heat treatment step has the additional advantage of reducing the amount of aluminum that is diffused into the substrate 70 from the bond coating layer 76. The growth of TGO layer 74 is dependent upon the availability of aluminum for diffusion from the bond coating layer 76. Accordingly, the TGO layer 74 will have the potential for a greater oxidation and corrosion thickness on a cold sprayed bond coat layer 76 than on a thermally applied layer having the same thickness because there is more aluminum available within the bond coat layer 76.

The cost of producing a turbine component may also be reduced as a result of the selective application of expensive alloying elements to only those specific areas of the component where the benefits of that expensive element are required. For example, it is known that the addition of platinum to an MCrAlY layer will improve the adhesion of an overlying ceramic coating. With prior art electroplating processes, a layer of platinum would be applied to the entire surface of a component exposed in an electroplating bath. However, the process 20 of FIG. 2 takes benefit of the selective coating capabilities of a cold spraying process to allow the designer to specify the addition of platinum over only a selected area of the component. Once a layer of bond coat material is deposited in step 34 of FIG. 2, an additional area to be coated may be identified in step 38. That area may be defined in step 24 to be a sub-set of the previously coated area, for example, only those portions of a gas turbine blade that are exposed to the highest of operating temperatures. An expensive material such as platinum may be specified in step 26 and applied to the sub-set area at step 34. In this manner, the quantity of the expensive material used, and the attendant cost, is minimized. Parameters may be selected at step 32 for the application of the expensive material to maximize the coefficient of particle utilization in order to reduce the cost of the coating further.

Figure 5:
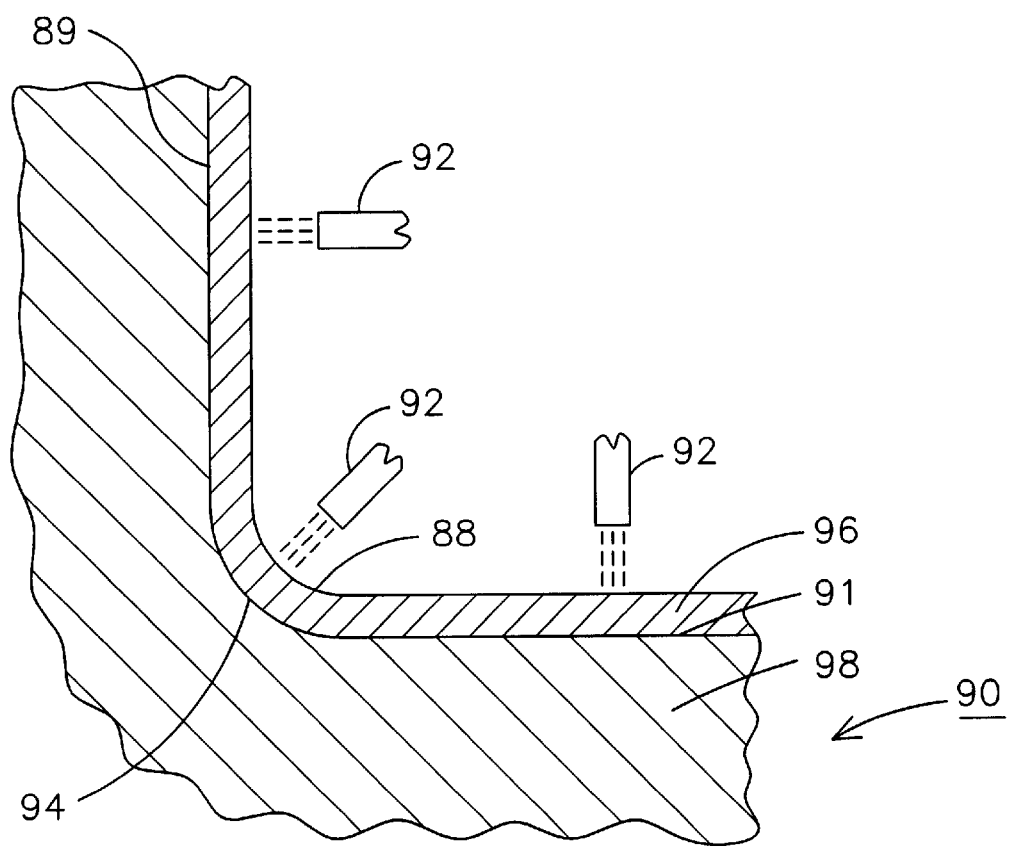
FIG. 5 is a partial cross-sectional view of the fillet area of a gas turbine blade showing the orientation of a cold spray nozzle during a bond coating material deposition step.

FIG. 5 illustrates the advantageous application of a cold spray material deposition step in the fillet area 88 of a turbine blade or vane 90. Prior art thermal spray techniques are known to present difficulties in applying a coating at the intersection of two surfaces 89,91, such as fillet area 88, because it is difficult to cause the coating material to impact the target surface at near a right angle. Because a cold spray nozzle 92 may be constructed to be physically small and to deposit a thin line of material, for example as small as 1 micron line width, it is possible to manipulate the nozzle 92 to remain perpendicular to the target surface 94 as it passes across the fillet area 88. FIG. 6 illustrates nozzle 92 in three positions as it progress across the surface of blade 90 to deposit an overlay coating 96 of MCrAlY over a superalloy blade substrate 98. Accordingly, the thickness of the overlay coating 96 may be maintained nearly constant throughout the fillet area 88, or it may purposefully be made to have a different thickness in different areas.

To optimize the adhesion of the layer 96 to the substrate material 98, it is desired to have a metal to metal contact between the layers. Any contamination, oxidation or corrosion existing on the surface of the substrate 98 may adversely impact the adhesion of the coating layer 96. A separate cleaning step, such as grit blasting with alumina particles, may be used to clean the target surface. However, such process may leave trace amounts of the cleaning material on the surface. After even a short period of exposure to moisture in air, the target surface may begin to oxidize. Handling or storing of the component after the cleaning step may introduce additional contaminants to the previously clean surface. The environment of the prior art thermal spraying processes also contributes to the oxidation of the substrate during the coating process due to the presence of high temperature, oxygen and other chemicals. The parameters selected at step 32 for the cold spray process of step 34 may be chosen to produce a desired halo effect of particles at the fringe of the spray area where the speed of approach to the target surface is insufficient to cause the particles to bond to the surface of the substrate 98, but is sufficiently high to produce a desired grit blast/cleaning effect. The halo effect is caused by the spread of particles away from a nozzle centerline due to particle interaction or by specific nozzle design. When the nozzle 92 is directed perpendicular to the target surface 89,91,94, the halo may be generally circular around a generally circular coating area. The halo effect and cleaning action may also have an elliptical shape caused by a non-perpendicular angle between the nozzle centerline and the plane of the substrate target surface of so desired. The halo effect provides a cleaning of the target surface coincident to the application of the coating layer 96, thereby improving the adhesion of the coating when compared to a prior art device wherein some impurities or oxidation may exist on the target surface at the time of material deposition.

It is known in the art to apply a layer of MCrAlY material by a thermal spraying process to form an overlay layer for protecting a superalloy substrate material from corrosion during operation as a part of a gas turbine engine. After operation within a turbine for a period of time, such parts are known to require a new coating of overlay material, as the original layer will be degraded by corrosion and/or erosion. Prior art turbine parts have been coated with up to 12 mils of such overlay material. Thicker layers are not practical because of the limitations of the known thermal spraying techniques. A process in accordance with this invention may be used to apply more than 12 mils of such overlay materials, for example coatings up to 20 mils thick or up to 25 mils thick. Because such layers are applied using a cold spray technique, there is no adverse build-up of stresses within the overlay layer or within the underlying substrate material. Accordingly, a turbine part having such a thicker layer of overlay material may remain in service longer before it must be re-coated with new overlay material.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method of applying a thermal barrier coating comprising the steps of:
   providing a substrate material;
   directing solid particles of bond coating material toward a surface of the substrate material at a velocity sufficiently high to cause the particles to deform and to adhere to the surface to form a layer of bond coating material;
   applying a layer of ceramic insulating material over the layer of bond coating material.

2. The method of claim 1, further comprising the step of controlling at least one of the velocity and a size of the particles to produce a predetermined roughness on the layer of bond coating material.

3. The method of claim 1, further comprising the step of directing solid particles of a barrier layer material toward the surface of the substrate at a velocity sufficiently high to cause the particles to deform and to adhere to the substrate surface to form a barrier layer prior to the step of directing particles of a bond coating material.

4. The method of claim 1, further comprising the step of directing solid particles of the bond coating material toward a first portion of the substrate surface to form a first thickness of bond coating material on the first portion and directing solid particles of the bond coating material toward a second portion of the substrate surface to form a second thickness of bond coating material on the second portion.

5. The method of claim 1, further comprising the step of varying the composition of the particles of bond coating material during the step of directing solid particles of bond coating material to produce a layer of bond coating material having varying properties across its depth.

6. The method of claim 1, wherein the step of directing solid particles of a bond coating material further comprises controlling the particles to form a plurality of micro-ridges on the surface of the layer of bond coating material.

7. A method of fabricating a component for a gas turbine engine, the method comprising the steps of:

forming a substrate comprising a superalloy material into a predetermined shape appropriate for use in a gas turbine engine; and directing solid particles of an MCrAlY material toward a surface of the substrate at a velocity sufficiently high to cause at least a first portion of the particles to deform and to adhere to the surface to form an overlay layer of MCrAlY material.

8. The method of claim 7, further comprising the step of directing solid particles of the MCrAlY material toward the surface of the substrate at a velocity not sufficiently high to cause a second portion of the particles to deform and to adhere to the surface but sufficiently high to clean the surface of the substrate.

9. The method of claim 7, further comprising the step of directing solid particles of the MCrAlY material toward a first portion of the substrate surface remote from a cooling hole to form a first thickness of MCrAlY material remote from the cooling hole and directing solid particles of the MCrAlY material toward a second portion of the substrate surface proximate the cooling hole to form a second thickness of MCrAlY material less than the first thickness proximate the cooling hole.

10. The method of claim 7, further comprising the step of directing solid particles of the MCrAlY material toward a first portion of the substrate surface to form a first thickness of MCrAlY material on the first portion and directing solid particles of the MCrAlY material toward a second portion of the substrate surface to form a second thickness of MCrAlY material on the second portion.

11. The method of claim 7, further comprising the step of controlling at least one of the velocity and a size of the particles to produce a predetermined roughness on the layer of MCrAlY material.

12. The method of claim 7, further comprising the step of applying a layer of ceramic insulating material over the layer of MCrAlY material.

13. The method of claim 7, further comprising continuing the step of directing solid particles until the overlay layer of MCrAlY material is formed to a thickness of between 12 and 25 mils.

14. A method of fabricating a component for a gas turbine engine, the method comprising the steps of:

forming a substrate into a predetermined shape useful in a gas turbine;

defining a first surface area of the substrate and a second surface area of the substrate as a function of the environment to which the predetermined shape will be exposed during the operation of the gas turbine;

directing, solid particles of a bond coating material toward a surface of the substrate at a velocity sufficiently high to cause the particles to deform and to adhere to the surface to form a layer of bond coating material having a first thickness over the first surface area and a second thickness over the second surface area.

15. A method of fabricating a component for a gas turbine engine, the method comprising the steps of:

forming a substrate into a predetermined shape appropriate for use in a gas turbine engine;

depositing a plurality of layers of an overlay coating on a surface of the substrate by directing solid particles of a coating material toward the surface at a velocity sufficiently high to cause the particles to deform and to adhere to the surface; and changing the composition of the particles between a first composition for a first of the plurality of layers to a second composition for a second of the plurality of layers.

16. The method of claim 15, further comprising the steps of:

forming a first of the plurality of the layers to be a diffusion barrier by selecting the first composition to comprise at least one of rhenium, tantalum, platinum and alloys thereof.

17. The method of claim 15, further comprising the steps of:

controlling at least one of the velocity and a size of the particles to produce a predetermined roughness on a top of the plurality of layers; and depositing a ceramic insulating layer onto the top of the plurality of layer.

18. A method of forming a part for a turbine, the method comprising the steps of:

providing a substrate;

applying a layer of a bond coat material to a surface of the substrate by directing solid particles of MCrAlY material toward the surface of the substrate at a velocity sufficiently high to cause the particles to deform and to adhere to the surface of the substrate;

applying a layer of platinum to only a selected portion of the layer of bond coat material by directing solid particles of platinum toward a surface of the layer of bond coat material at a velocity sufficiently high to cause the particles to deform and to adhere to the surface of the layer of bond coat material;

subjecting the layer of platinum to a diffusion heat treatment process; and applying a layer of a ceramic insulating material over at least the selected portion of the layer of bond coat material.

* * * * *